United States Patent
Shirie (10) Patent No.: US 7,158,318 B2
(45) Date of Patent: Jan. 2, 2007

(54) FLARE STOPPPER AND TAKING LENS UNIT

(75) Inventor: Nobuyuki Shirie, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/725,521

(22) Filed: Dec. 3, 2003

(65) Prior Publication Data

US 2004/0120046 A1   Jun. 24, 2004

(30) Foreign Application Priority Data

Dec. 3, 2002   (JP) .............................. 2002-351276

(51) Int. Cl.
 G02B 9/08   (2006.01)
 G02B 7/02   (2006.01)
 G02B 27/00  (2006.01)
(52) U.S. Cl. .................... 359/738; 359/601; 359/689; 359/819
(58) Field of Classification Search ........ 359/601–614, 359/694–706, 800–830, 738–740; 396/65, 396/144, 29, 72, 349, 535
See application file for complete search history.

(56) References Cited

U.S. PATENT DOCUMENTS

| 4,542,963 A * | 9/1985 | Linlor .......................... 359/399 |
| 4,810,076 A * | 3/1989 | Murao et al. ................ 359/738 |
| 4,820,923 A * | 4/1989 | Wellman ...................... 250/352 |
| 4,886,342 A * | 12/1989 | Kudo et al. .................. 359/738 |
| 5,115,350 A * | 5/1992 | Tanaka ......................... 359/823 |
| 5,121,251 A * | 6/1992 | Edwards ...................... 359/368 |
| 5,189,554 A * | 2/1993 | Vanasse et al. ............. 359/601 |
| 5,210,645 A * | 5/1993 | Orino et al. ................. 359/738 |
| 5,276,552 A * | 1/1994 | Kohmoto et al. ........... 359/601 |
| 5,420,656 A * | 5/1995 | Kohmoto ..................... 396/448 |
| 5,568,322 A * | 10/1996 | Azami et al. ............... 359/689 |
| 6,392,825 B1 * | 5/2002 | Trunz et al. ................. 359/819 |
| 6,442,343 B1 | 8/2002 | Kameyama et al. .......... 396/65 |
| 6,552,859 B1 * | 4/2003 | Matsumoto et al. ........ 359/738 |

FOREIGN PATENT DOCUMENTS

| JP | 59-166204 | 11/1984 | |
| JP | 4-129039 | * 4/1992 | ................. 359/611 |
| JP | 6-300950 | * 10/1994 | ................. 359/601 |
| JP | 2002-325728 | 11/2002 | |

* cited by examiner

*Primary Examiner*—Thong Nguyen
(74) *Attorney, Agent, or Firm*—Young & Thompson (57) ABSTRACT

A ring-shaped flare stopper is made of a phosphor bronze plate having a thickness of 0.03 mm by sheet metal stamping. An inner periphery for defining a circular opening is formed in the flare stopper. The inner periphery has the form of the side face of a circular truncated cone. The flare stopper is so installed in a lens barrel that the inner periphery is inclined with respect to an optical axis of a taking lens unit. Since incident light is not reflected by the inner periphery of the flare stopper, the occurrence of ghost and flare is prevented. To prevent the deformation and misalignment of the flare stopper, the flare stopper installed in the lens barrel is attached to a spacer.

8 Claims, 7 Drawing Sheets

FLARE STOPPPER AND TAKING LENS UNIT

BACKGROUND OF THE INVENTION

1. Field of the Invention

The present invention relates to a flare stopper which reduces the occurrence of ghost and flare, and a taking lens unit having the flare stopper.

2. Description Related to the Prior Art

A lens barrel of a camera, as disclosed in, for example, U.S. Pat. No. 6,442,343, is generally provided with a flare stopper to prevent the occurrence of flare. The ring-shaped flare stopper is made of thin polyester film (known under the trade name of "Mylar") having a thickness of approximately 0.03 to 0.05 mm. Incident light upon a taking lens passes through a circular opening defined by the inner periphery of the flare stopper to reduce the occurrence of flare.

There is a case, however, where a part of incident light reflected by the inner periphery of the flare stopper causes ghost or flare, even if such a flare stopper is adopted.

SUMMARY OF THE INVENTION

An object of the present invention is to provide a flare stopper which further reduces the occurrence of ghost and flare.

Another object of the present invention is to provide a taking lens unit having such a flare stopper.

To achieve the above objects, a flare stopper according to the present invention is installed in a lens barrel for holding a taking lens. An inner periphery for defining a circular opening to pass incident light upon the taking lens is formed in the flare stopper. The inner periphery has the form of a side face of a circular truncated cone.

The flare stopper may be made of a phosphor bronze plate having a thickness of approximately 0.03 mm by sheet metal stamping.

The flare stopper may be made of Mylar (trade name) having a thickness of approximately 0.03 to 0.05 mm by sheet metal stamping.

A taking lens unit according to the present invention comprises a lens barrel, plural lens elements contained in the lens barrel, and a flare stopper disposed between the lens elements. An inner periphery for defining a circular opening to pass incident light upon the taking lens is formed in the flare stopper. The inner periphery is inclined with respect to an optical axis of the taking lens unit.

A taking lens unit may further comprise a spacer disposed between the lens elements. The flare stopper installed in the taking lens unit is attached to the spacer.

According to the present invention, since the inner periphery of the flare stopper is inclined with respect to the optical axis of the taking lens unit, the occurrence of ghost and flare is further reduced. The flare stopper disposed between the plural lens elements is attached to a spacer. Therefore, it is possible to precisely install the flare stopper in the lens barrel without deformation and misalignment.

BRIEF DESCRIPTION OF THE DRAWINGS

The above objects and advantages of the present invention will become easily understood by one of ordinary skill in the art when the following detailed description would be read in connection with the accompanying drawings, in which.

PREFERRED EMBODIMENTS OF THE INVENTION

Figure 1:
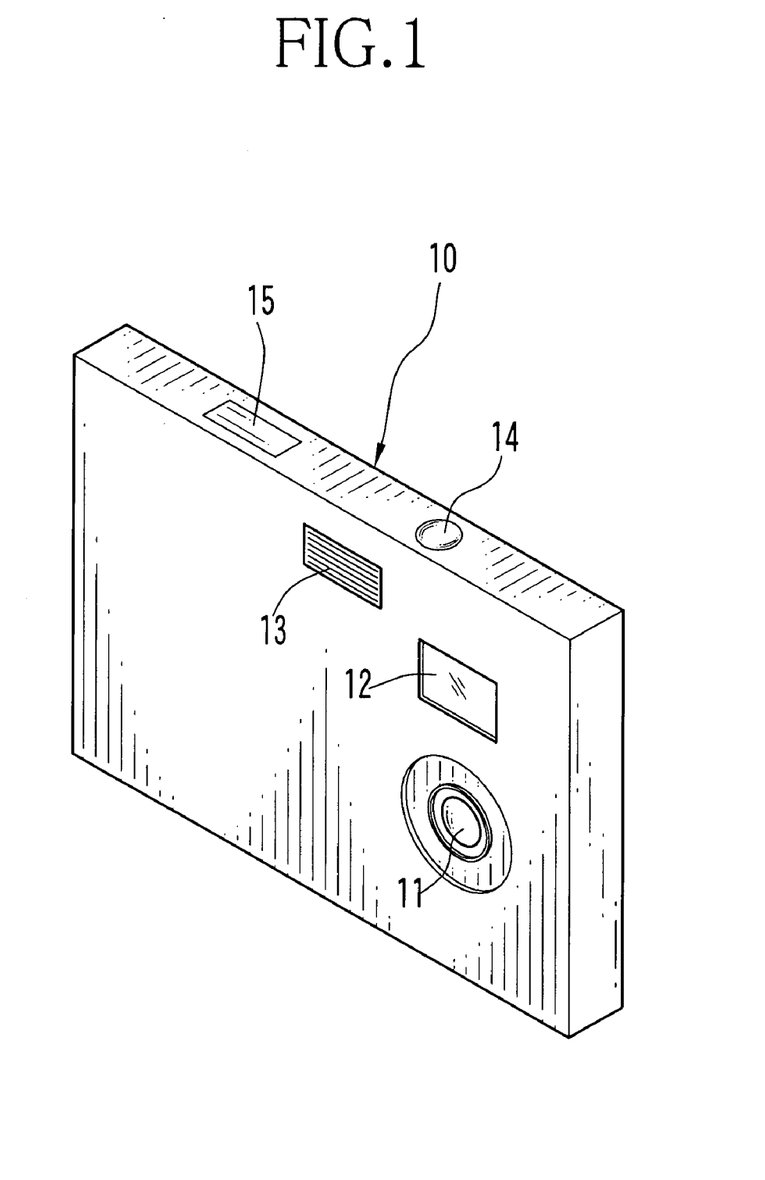
FIG. 1 is a front perspective view of a digital camera which adopts a flare stopper according to the present invention.

In FIG. 1, a digital camera 10 has a taking lens unit 11, a viewfinder objective window 12, and a flash projector 13 in a front surface. A power switch 14 and a release button 15 are provided in the top surface of the digital camera 10, and a viewfinder eyepiece window, LCD and the like (not illustrated) are provided in the rear surface thereof.

Figure 2:
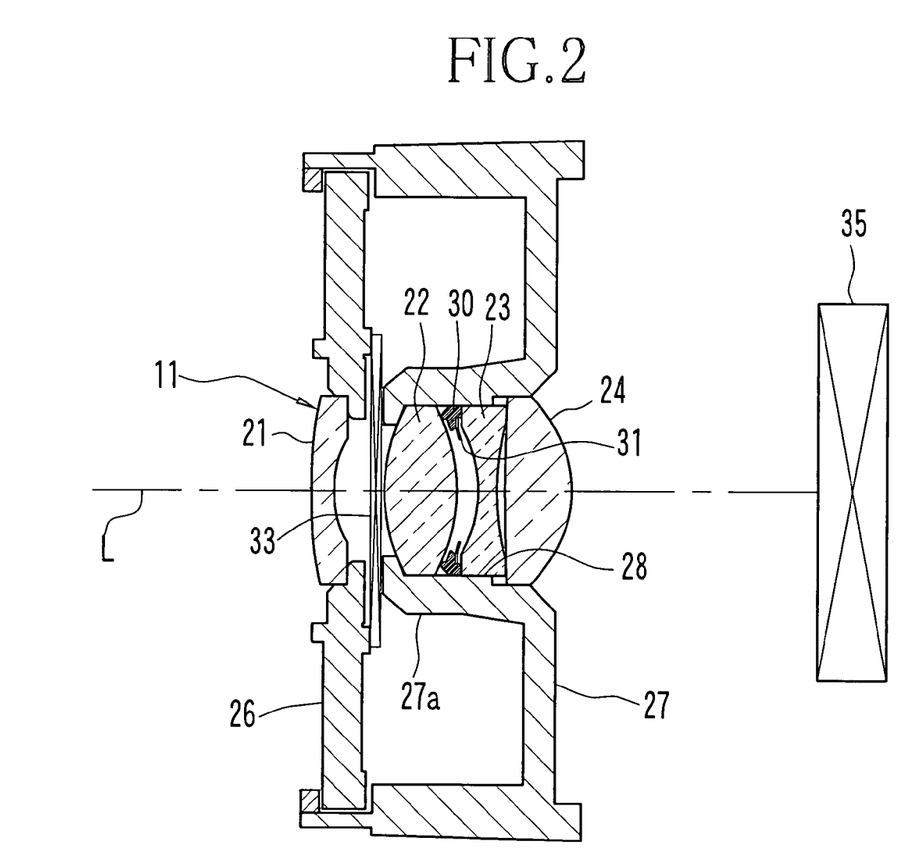
FIG. 2 is a sectional view of a taking lens unit.

Referring to FIG. 2, the miniature taking lens unit 11 comprises first to fourth lens elements 21 to 24 the diameter of which is approximately 5 mm. The first to fourth lens elements 21 to 24 are aligned in this order from an objective side. The first lens element 21 is fitted into a lens frame 26 provided in a lens barrel 27. The second to fourth lens elements 22 to 24 are successively fitted into a groove 28 formed in a barrel portion 27a of the lens barrel 27, so that the second and fourth lens elements 22 and 24 are positioned in both ends of the barrel portion 27a, respectively.

A spacer 30 with a flare stopper 31 is disposed between the second and third lens elements 22 and 23. The flare stopper 31 is fitted into a circular groove 30a formed in the spacer 30 (refer to FIGS. 3 and 4). A shutter 33 is disposed between the lens frame 26 and the barrel portion 27a, and a CCD image sensor 35 is disposed behind the taking lens unit 11.

Figure 3:
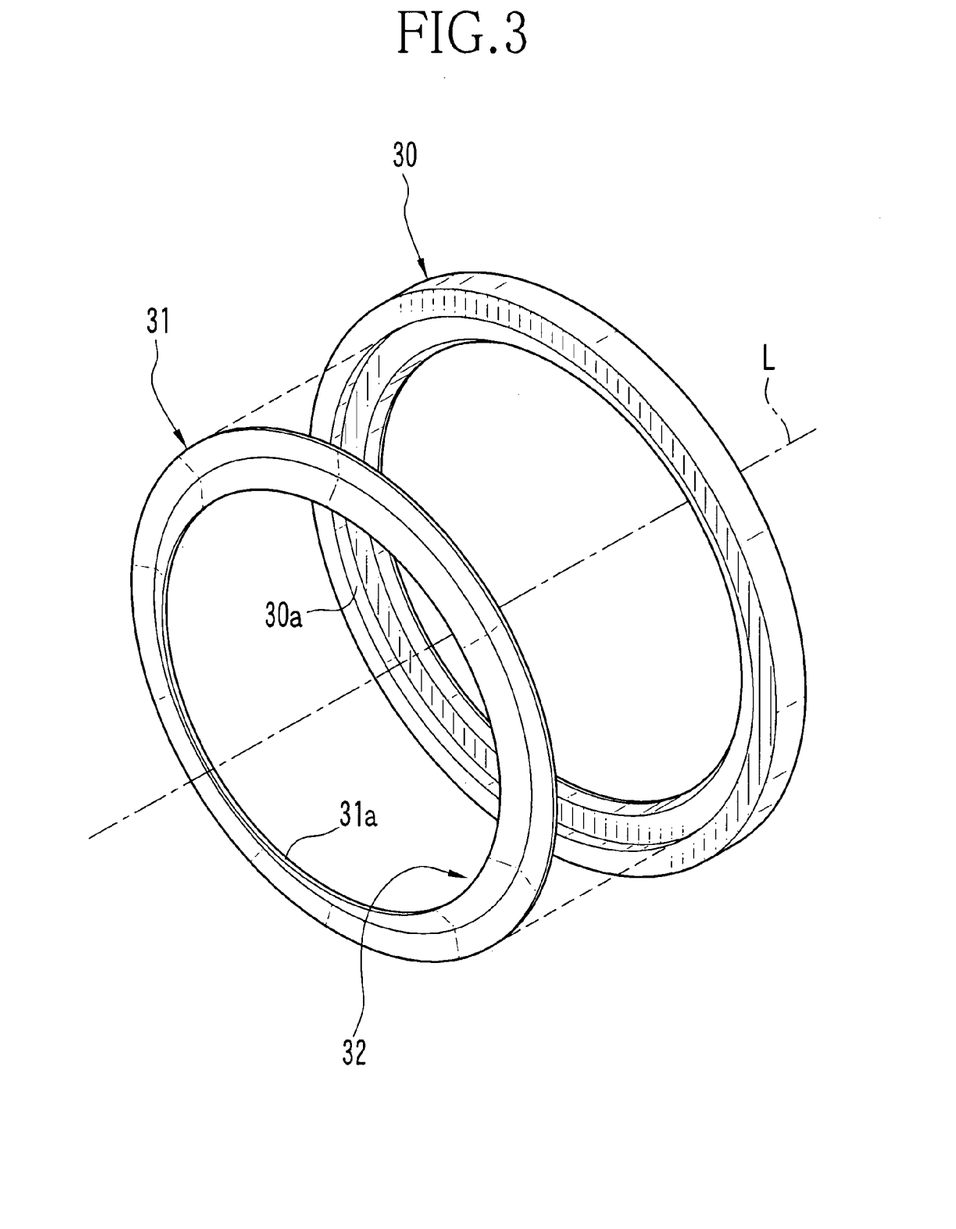
FIG. 3 is a partial perspective view of the flare stopper and a spacer.
Figure 4:
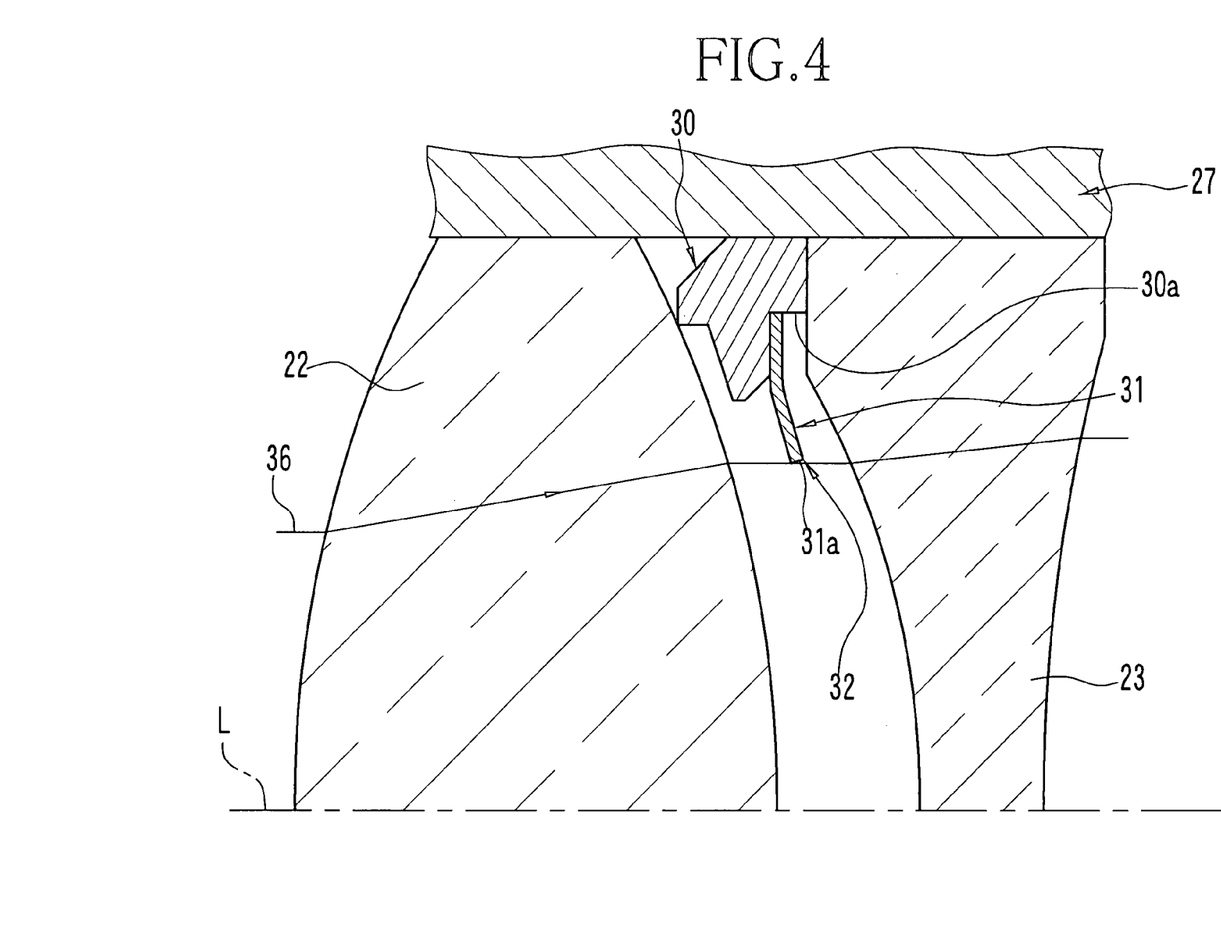
FIG. 4 is an enlarged view of FIG. 2 which shows the positional relation between the flare stopper and the spacer installed in the taking lens unit.

FIGS. 3 and 4, the ring-shaped (washer-shaped) flare stopper 31 is made of, for example, a phosphor bronze plate having a thickness of 0.03 mm by sheet metal stamping. The inner portion 31a of the flare topper 31 is dented with respect to the outer portion thereof, effectively dividing flare stopper 31 into first and sections identified in FIG. 3, and the inner periphery 31a has the form of the side face of a circular truncated cone. After sheet metal stamping, the flare stopper 31 is painted matt black to prevent reflection. The flare stopper 31 is so fitted into the circular groove 30a of the spacer 30 that the inner periphery 31a thereof faces onto the third lens element 23. Thus, the inner periphery 31a is inclined with respect to an optical axis L of the taking lens unit 11.

After attachment to the spacer 30, the flare stopper 31 is disposed between the lens elements 22 and 23, instead of attaching the flare stopper 30 directly to the taking lens unit 11. Therefore, the flare stopper 31 is installed in the taking lens unit 11 without deformation and misalignment.

The operation of the flare stopper 31 will be hereinafter described. Upon pressing the release button 15 of the digital camera 10 after framing a subject, the shutter 33 opens.

Incident light 36 passing through the first and second lens elements 21 and 22 reaches the flare stopper 31. Since the inner periphery 31a of the flare stopper 31 is inclined with respect to the optical axis L of the taking lens 11, incident light 36 is not reflected by the inner periphery 31a when passing through the circular opening 32. Hence, the occurrence of ghost and flare is reduced. Incident light 36, passing through the circular opening 32 and the third and fourth lens elements 23 and 24, forms an optical image on an image plane of the CCD image sensor 35.

Figure 5:
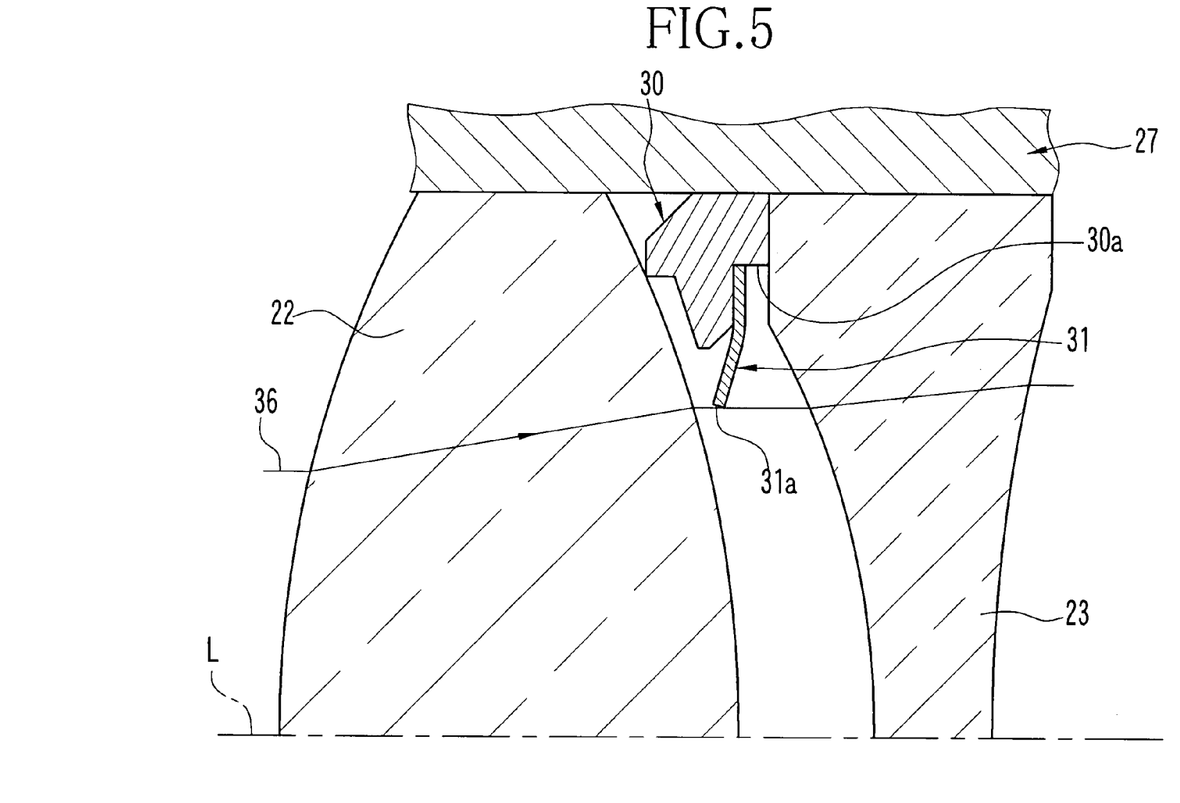
FIG. 5 is a sectional view showing the positional relation between a flare stopper and a spacer according to another embodiment.

In the above embodiment, the flare stopper 31 is so fitted into the circular groove 30a of the spacer 30 that the inner periphery 31a thereof faces the third lens element 23. The inner periphery 31a of the flare stopper 31, however, may face the second lens element 22, as shown in FIG. 5. In this case, since the inner periphery 31a of the flare stopper 31 is inclined with respect to the optical axis L of the taking lens unit 11, incident light 36 is not reflected by the inner periphery 31a, so that the occurrence of ghost and flare is reduced.

Figure 6:
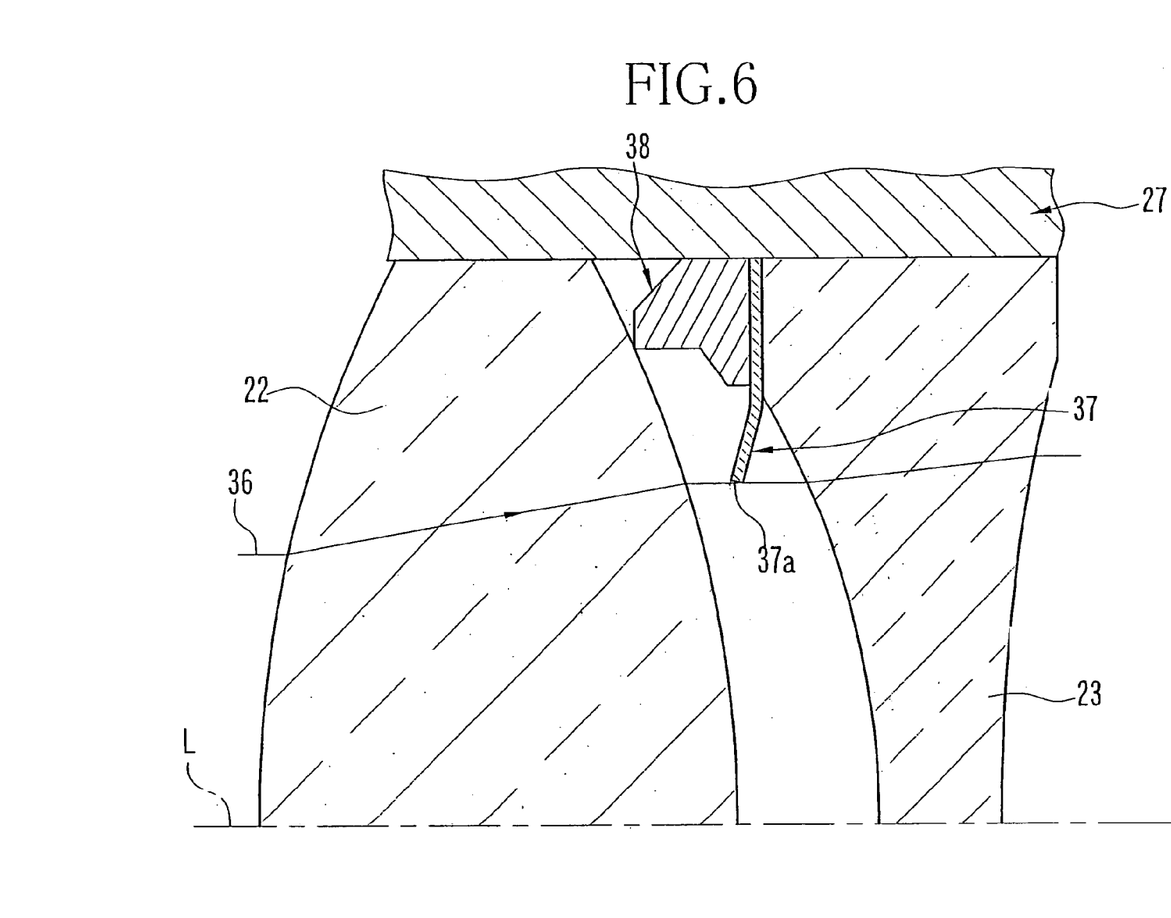
FIG. 6 is a sectional view showing the positional relation between a flare stopper and a spacer according to further another embodiment.

In the above embodiment, the flare stopper 31 fitted into the circular groove 30a of the spacer 30 is installed in the taking lens unit 11. A flare stopper 37, however, may be disposed between a spacer 38 and the third lens element 23, as shown in FIG. 6. In this case, the inner periphery 37a of the ring-shaped flare stopper 37 is inclined with respect to the optical axis L. Therefore, as is the case with the above embodiments, the occurrence of ghost and flare is effectively prevented.

In the above embodiments, the flare stopper 31 or 37 is made of the phosphor bronze plate moldable with high precision. The flare stopper, however, may be made of thin black polyester film (known under the trade name of "Mylar") having a thickness of approximately 0.03 to 0.05 mm by sheet metal stamping.

Figure 7:
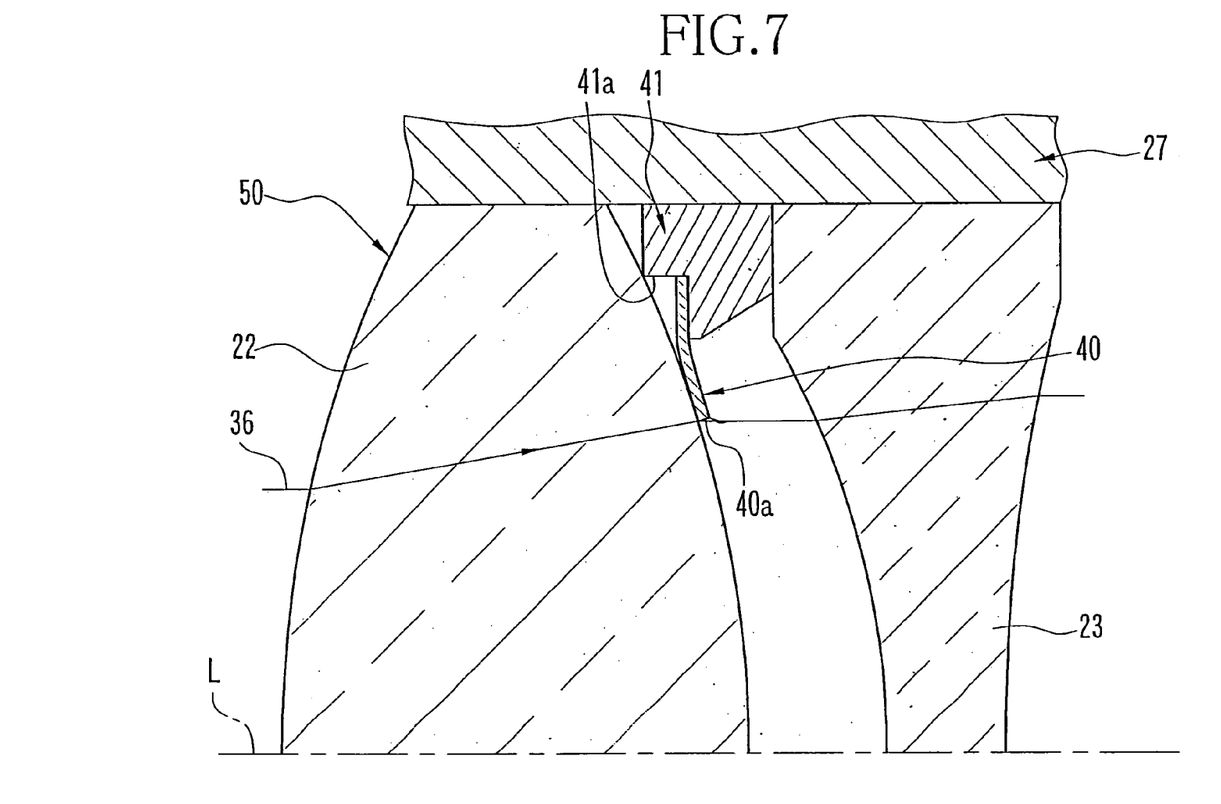
FIG. 7 is a sectional view showing the positional relation between a flare stopper and a spacer according to still further another embodiment.

FIG. 7 shows a flare stopper 40 made of Mylar. The flare stopper 40 is press-fitted into a circular groove 41a of a spacer 41. In assembling a taking lens unit 50, the spacer 41 is disposed between the second and third lens elements 22 and 23. The second lens element 22 presses the flare stopper 40 to elastically deform the inner peripheral side thereof. Thus, the inner periphery 40a of the ring-shaped flare stopper 40 is inclined with respect to the optical axis L. Since the incident light 36 is not reflected by the inner periphery 40a, it is possible to prevent ghost and flare.

The flare stopper 40 made of Mylar is deformable. The flare stopper 40, however, is precisely installed in the lens barrel 27 without misalignment, because the flare stopper 40 is attached to the spacer 41.

In the above embodiments, the thickness of the phosphor bronze plate is approximately 0.03 mm, and the thickness of Mylar is approximately 0.03 to 0.05 mm. The thickness of the phosphor bronze plate and Mylar, however, is not limited to these values. The structure of the taking lens unit 11 or 50 may be properly changeable too.

In the above embodiments, the flare stopper 31, 37 or 40 is applied to the taking lens unit 11 or 50 of the digital camera 10. The flare stopper according to the present invention, however, is also applicable to a taking lens of a camera-equipped cellular phone, a lens-fitted photo film unit, or the like.

Although the present invention has been described with respect to the preferred embodiments, the present invention is not limited to the above embodiments but, on the contrary, various modifications will be possible to those skilled in the art without departing from the scope of claims appended hereto.

What is claimed is:

1. A taking lens unit comprising:
   a lens barrel;
   plural lens elements contained in said lens barrel; and
   a flare stopper disposed between said lens elements so that light that passes through at least one of the plural lens elements falls on the flare stopper, an inner periphery of the flare stopper defining a circular opening to pass incident light upon said taking lens unit, said flare stopper comprising a sheet material having an overall shape defined by first and second sections;
   wherein the first section of the sheet material has a shape of a planar ring, and the second section of the sheet material has a shape of a side face of a circular truncated cone, with an outermost portion of the second section meeting an innermost portion of the first section;
   wherein an innermost portion of the second section defines said circular inner periphery;
   wherein said sheet material comprises Mylar (trade name) film and the overall shape of the flare stopper is produced by sheet metal stamping; and
   wherein the flare stopper and one of the lens elements are arranged so that one of said lens elements presses and deforms said flare stopper so that said inner periphery is inclined with respect to said optical axis of said taking lens unit.

2. A taking lens unit as recited in claim 1, further comprising:
   a spacer disposed between said lens elements, wherein said flare stopper in said taking lens unit is attached to said spacer.

3. A taking lens unit as recited in claim 1, wherein the thickness of said Mylar film is approximately 0.03 to 0.05 mm.

4. A taking lens unit as recited in claim 1, wherein said flare stopper is nipped and held between a first of said lens elements and a spacer, the spacer being arranged between the first lens element and another of the lens elements.

5. A taking lens unit comprising:
   a lens barrel;
   plural lens elements contained in said lens barrel; and
   a flare stopper disposed between said lens elements, an inner periphery of the flare stopper defining a circular opening to pass incident light upon said taking lens unit
   wherein said circular inner periphery is defined by a portion of the flare stopper that is inclined with respect to an optical axis of said taking lens unit; and
   wherein the flare stopper and one of the lens elements are arranged so that one of said lens elements presses and deforms said flare stopper so that said inner periphery is inclined with respect to said optical axis of said taking lens unit, the flare stopper and the lens element that deforms the flare stopper being arranged with respect to one another such that an inner portion of the flare stopper is in contact with the deforming lens element, with a space being present between an outer portion of the flare stopper and the deforming lens.

6. A taking lens unit comprising:
   a lens barrel;
   plural lens elements contained in said lens barrel; and
   a flare stopper disposed between said lens elements so that light that passes through at least one of the plural lens elements falls on the flare stopper, an inner periphery of the flare stopper defining a circular opening to pass incident light upon said taking lens unit, said flare stopper comprising a sheet material having an overall shape defined by first and second sections;

wherein the first section of the sheet material has a shape of a planar ring, and the second section of the sheet material has a shape of a side face of a circular truncated cone, with an outermost portion of the second section meeting an innermost portion of the first section;

wherein an innermost portion of the second section defines said circular inner periphery; and wherein the flare stopper and one of the lens elements are arranged so that one of said lens elements presses and deforms said flare stopper so that said inner periphery is inclined with respect to said optical axis of said taking lens unit.

7. A taking lens unit as recited in claim 6, further comprising:

a spacer disposed between said lens elements, wherein said flare stopper in said taking lens unit is attached to said spacer.

8. A taking lens unit as recited in claim 6, wherein said flare stopper is nipped and held between a first of said lens elements and a spacer, the spacer being arranged between the first lens element and another of the lens elements.

* * * * *